Nov. 7, 1950  J. G. STRONG  2,528,799
ROD RETRIEVER ASSEMBLY
Filed June 3, 1948
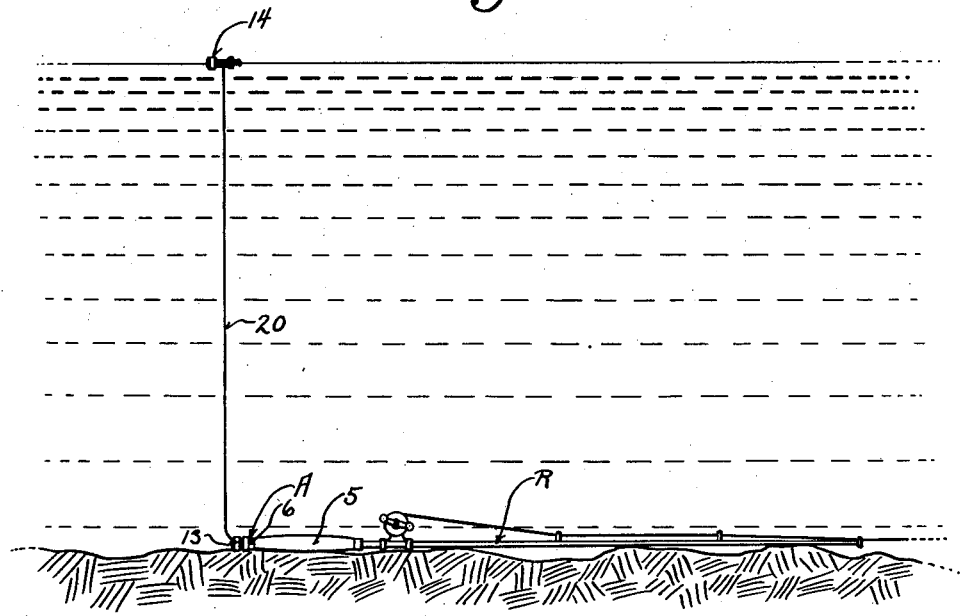
Fig. 1.
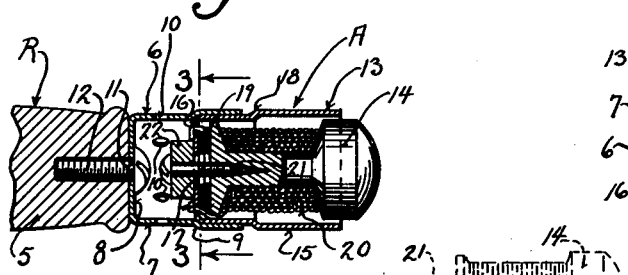
Fig. 2.
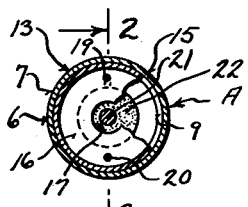
Fig. 3.
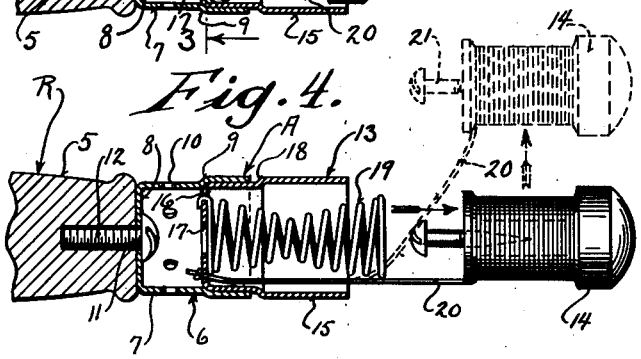
Fig. 4.
INVENTOR
JOHN G. STRONG
BY
ATTORNEYS Patented Nov. 7, 1950

2,528,799

UNITED STATES PATENT OFFICE 2,528,799

ROD RETRIEVER ASSEMBLY

John Gordon Strong, Milwaukee, Wis.

Application June 3, 1948, Serial No. 30,940

4 Claims. (Cl. 9—9)

1

This invention appertains to a novel means for facilitating the recovery of articles accidentally dropped overboard and more particularly to a float for association with a desired article and automatically releasable therefrom upon the submerging of the article.

One of the primary objects of my invention is to provide an attachment for fishing rods and other articles embodying a line spool float and a case therefor having a spring normally tending to eject the float from the case, with a dissolvable tablet for holding the float in place in the case against action of the spring.

Another salient object of my invention is to provide means, whereby a freely renewable and dissolvable tablet or disk can be conveniently and quickly associated with the article retrieving attachment.

A further important object of my invention is the provision of a fishing rod retriever, which merely embodies a cap for association with the rod, a float case frictionally fitted in the cap, a floatable line spool receivable in the case against action of a spring, and a dissolvable tablet in the cap engaging a part of the spool for holding the same in position in the case against action of the spring.

A still further object of my invention is to provide an article retrieving device, which will be durable and efficient in use, one that will be simple and easy to manufacture, and one which can be easily associated with the desired article.

With these and other objects in view, the invention consists in the novel construction, arrangement and formation of parts, as will be hereinafter more specifically described and claimed and illustrated in the accompanying drawing, in which drawing, Figure 1 is a side elevational view, showing my novel retrieving device attached to a fish rod, the rod being submerged in a body of water and the spool float released, indicating the position of the rod.

Figure 2 is a central, longitudinal, sectional view through the retrieving device, showing the same in operative position on the butt end of a fishing rod, the section through the retrieving device being taken substantially on the line 2—2 of Figure 3, looking in the direction of the arrows.

Figure 3 is a transverse sectional view through the retrieving device, taken on the line 3—3 of Figure 2, looking in the direction of the arrows.

Figure 4 is a view similar to Figure 2, but showing the ejecting of the spool float upon the dissolving of the tablet in water.

2

Referring to the drawing in detail, wherein similar reference characters designate corresponding parts throughout the several views, the letter A generally indicates my novel retrieving attachment. The retrieving attachment A can be used with various types of articles, such as fishing rods, guns, outboard motors and the like. In the drawing, I have shown the attachment applied to a fishing rod R.

The fishing rod R forms no part of my present invention and can be considered of any character or make. As illustrated, the same includes a handle 5 to the butt end of which is adapted to be secured, the attachment A, as will be later set forth.

The novel retrieving attachment A, includes a cap 6. This cap 6 comprises a cylindrical side wall 7 and an end wall 8. The side wall 7 at its outer end can be slightly flanged outwardly to form a stop shoulder 9. This cap inward of the stop shoulder, has formed therein water inlet openings 10. The end wall 8 can be provided with a central opening 11, for the reception of a fastening screw 12, or the like, so that the cap can be easily secured to the butt end of the fishing rod handle 5.

Detachably fitted in the cap 6 is a case 13 for detachably receiving the float spool 14. The case 13 includes a cylindrical side wall 15 and an inner end wall 16, which is centrally apertured, as at 17. The inner end of the side wall 15 is flanged inwardly to provide a stop shoulder 18, and the case is frictionally fitted in the cap as can be clearly seen by referring to Figures 2 and 4. Anchored to the end wall 16 at one side of the openings 17 is an expansion coil spring 19. The cap 6 and the case 13 can be formed from any material, but metal is preferred.

The float spool 14 is made of some light material, such as wood, cork, etc. The same can be, and preferably is, painted a bright color so that the same can be easily seen when floating at the surface of the water. The spool has wound thereon a line 20. One end of the line can be secured to the spool and the other end of the line can be secured to the case 13.

The inner end of the spool 14 has secured thereto at its axial center a headed stud 21. This stud 21 is preferably in the nature of a screw so that the same can be detachably connected to the spool.

In use of my device the spool 14 with the line 20 wound thereabout is inserted in the case 13, against the tension of the spring 19, and until the spring is completely collapsed. The headed stud then extends through the convolutions of the spring and through the opening 17. The case 13 is removed from the cap and the screw or stud 21 is removed from the spool. A soluble tablet 22 is placed against the end wall 16 of the case. This soluble tablet is of a larger size than the opening 17. The stud or screw is now inserted through the tablet and threaded into the spool. This will retain the spool in place in the case. The case is now re-inserted in the cap, it being understood that the cap has previously been secured to the rod handle 5.

The tablet 22 can be made from any material which will quickly dissolve in water, such as a salt tablet or the like.

After the rod R, or other article with which the retrieving attachment A is associated with, is dropped overboard, the tablet 22 will dissolve and the spring 19 will eject the float spool 14 from the case. The line 20 will unwind from the spool and the spool will float to the surface and indicate the position of the submerged article.

Upon the recovery of the article, a new tablet 22 can be quickly associated with the retrieving device and consequently the device will again be ready for use.

Much stress is laid upon the quick renewability of the tablet.

Changes in details may be made without departing from the spirit or the scope of my invention, but what I claim as new is:

1. An article retrieving device comprising a cap for association with the article, a case detachably fitted in the cap, a spool float detachably fitted in the case, a line wound upon the spool float having one end secured to the case, a spring in said case for ejecting the spool float from the case, and a renewable, soluble tablet carried by the spool and engaging the case for holding the spool in the case against action of the spring.

2. An article retrieving attachment comprising a cap for association with the article, a case detachably fitted in the cap, said cap having openings for the admittance of water, a spool float detachably fitted in the case, a line wound around the spool having one end secured to the case, a spring in said case normally tending to eject the spool from the case, a headed stud carried by one end of the spool receivable in the cap when the spool is in the case with the spring under tension, and a soluble tablet carried by said headed stud engaging the case for holding the spool in the case against action of the spring.

3. An article retrieving attachment comprising a cap for association with the article, a case detachably fitted in the cap, said cap having openings for the admittance of water, a spool float detachably fitted in the case, a line wound around the spool having one end secured to the case, a spring in said case normally tending to eject the spool from the case, a headed stud carried by one end of the spool receivable in the cap when the spool is in the case with the spring under tension, and a soluble tablet carried by said headed stud engaging the case for holding the spool in the case against action of the spring, said stud being freely removable from the spool to permit the replacing of the tablet.

4. An article retrieving attachment comprising a cap, means for securing the cap to an article, said cap having openings for the admittance of water, a case having an inner end wall detachably fitted in the cap, a spool float detachably received in said case, a line wound upon said spool having one end secured to the case, said end wall having an opening, a removable headed stud carried by the inner end of the spool insertable through the opening, a soluble tablet on said stud engaging the end wall of the case around the opening and received in said cap, and an expansion spring in said case for ejecting the spool float from the case upon the dissolving of the tablet.

JOHN GORDON STRONG.

REFERENCES CITED

The following references are of record in the file of this patent:

UNITED STATES PATENTS

| Number | Name | Date |
|---|---|---|
| 1,290,927 | De Fontaine et al. | Jan. 14, 1919 |
| 2,190,531 | Kaboskey | Feb. 13, 1940 |